3,107,236
PREPARATION OF POLYPROPYLENE
William E. Thompson, Wallingford, Archibald P. Stuart, Media, and James L. Jezl, Swarthmore, Pa., assignors to Sun Oil Company, Philadelphia, Pa., a corporation of New Jersey
No Drawing. Filed Dec. 17, 1956, Ser. No. 628,557
15 Claims. (Cl. 260—93.7)

This invention relates to the polymerization of propylene to form solid polymers thereof, hereinafter designated "polypropylene."

The polymerization of olefins, including propylene, by various catalytic means has heretofore been described. Such processes, however, generally prepare liquid products, e.g., liquid polymers of propylene having relatively low molecular weights. A process for polymerizing propylene to solid polymers which involves the use of organo-metallic compounds such as aluminum trialkyls has also been described. However, such processes have not been entirely satisfactory because such organo-metallic compounds are flammable and hence difficult to prepare and use, especially in commercial polymerization processes. Such processes are also unsatisfactory in that substantially no control over the molecular weights of the polymer products is possible, and in some instances polymerization is so slow that the process is not commercially feasible.

An object of the present invention is to provide a process for the polymerization of propylene to solid polymers. Another object is to provide a process for preparing polypropylene which does not require the use of organo-metallic compounds such as aluminum trialkyls. A further object is to provide a process for preparing polypropylene in which the molecular weight of the product is regulated to a desired value. A still further object is to provide a process for polymerizing propylene in which the polymerization process is accelerated. Other objects will be apparent hereinafter.

It has now been found that by dispersing, in an inert liquid reaction medium, a halide or salt of a metal of group IV, V, or VI of the periodic table wherein the metal of the halide or salt is in a valence state other than its highest valence state, a hydride containing an alkali metal, and aluminum trichloride, and contacting the resulting dispersion with propylene under polymerizing conditions as hereinafter described, the propylene is converted to relatively high molecular weight solid polymers. It has been further found that by preparing the dispersion of catalytic components in a certain manner as hereinafter described, the polymerization process can be substantially accelerated. It has been further found that by preparing the dispersion of catalytic materials in the presence of a minor quantity of an olefin, as hereinafter described, the molecular weight of the polypropylene product can be regulated to a desired value.

The catalyst used in the polymerization process of the invention contains three components, as above described. Halides or salts of the metals of groups IV, V, and VI of the periodic table form one component of the catalyst. Preferably a halide or salt of titanium, zirconium, hafnium, vanadium, niobium, chromium, molybdenum or tungsten is used, and titanium trichloride gives especially good results. The metal of the metal compound must be in a valence state other than its highest valence state. The prepartion of such halides or salts can be by any convenient means. The reduction of a metal compound such as titanium tetrachloride to titanium trichloride, for example, can be accomplished by any convenient means and the product used in the process of the invention. Thus, an admixture of hydrogen and titanium tetrachloride in vapor phase can be heated, or other reducing means such as by contacting the metal compound with a dispersion of an alkali metal in an inert solvent can be used. Alkali metal hydrides which can be used as a catalytic component contain an alkali metal and hydrogen, and may contain other components such as aluminum, boron, or the like. Lithium hydride, lithium aluminum hydride, sodium hydride, potassium hydride, sodium borohydride and potassium borohydride illustrate the alkali metal hydrides, including alkali metal borohydrides, which give good results.

For simplicity, the following description of the process of the invention will be directed to using sodium hydride, titanium trichloride and aluminum trichloride as the catalytic components, it being understood that certain other materials as above described can be substituted for the sodium hydride and/or the titanium trichloride. Aluminum chloride appears specific in the process, and other materials cannot be substituted therefor.

In an embodiment of the process of the invention, sodium hydride, titanium trichloride and aluminum trichloride are dispersed in n-heptane. The temperature of the dispersion is adjusted within the range of from about 100° C. to 180° C. and propylene contacted therewith. On contacting the dispersion, the propylene is converted to solid polymers. Oxygen and water are excluded from the polymerization process, since the catalyst is adversely affected thereby.

The ratio of catalytic components to employ is important, but can be varied within certain ranges and good results obtained. The mole ratio of titanium trichloride to aluminum trichloride should be within the ranges of from 0.5:1 to 10:1. The mole ration of sodium hydride to titanium trichloride plus aluminum trichloride should be within the range of from 1:1 to 10:1.

The liquid reaction medium employed should be a liquid, saturated hydrocarbon which is substantially inert in the polymerization reaction. Paraffin hydrocarbons, including isoparaffins, such as the pentanes, hexanes, heptanes, octanes, decanes, and homologues and mixtures thereof give good results, as do cycloparaffins such as cyclopentane, methylcyclopentane, cyclohexane, methylcyclohexane, decalin, and homologues and mixtures thereof with each other and with paraffins.

The temperature of the polymerization reaction must be at least 100° C. and preferably is within the range of from 110° C. to 180° C. The pressure must be sufficient to maintain liquid phase reaction and is preferably at least 50 p.s.i.g. (pounds per square inch gauge) and may be as high as 10,000 p.s.i.g. The time of reaction will vary according to the other reaction conditions and the type of operation used. Generally a time of from 10 minutes to 4 hours is sufficient but lower or considerably lower periods of time can be used if desirable.

The product may be recovered by any convenient means. It is preferred to admix the product with isopropanol or other alcohol containing a small quantity of an inorganic acid such as nitric acid. By refluxing this mixture the catalytic components are substantially dissolved so that after washing such as with an alcohol, the resulting product contains only a negligible quantity of the catalytic components.

The process of the invention can be operated as a continous, intermittent, or batch-type operation. The above limits of reaction are primarily directed to batch-type operation, but equivalent conditions give good results in continuous or intermittent operation.

As above stated, an object of the present invention is to provide a process for polymerizing olefins in which the polymerization process is accelerated, i.e., in which a maximum rate of polymerization of propylene is obtained.

It has been found that by preparing the catalyst in a specific manner, the rate of polymerization of propylene is substantially accelerated. In accordance with this embodiment of the process, titanium trichloride and sodium hydride are together preheated in an inert hydrocarbon such as above described for the inert reaction medium. The mixture should be heated to about the temperature to be subsequently used in the polymerization reaction, which is a temperature within the range of from about 100° C. to 180° C. The heated mixture is then cooled to a temperature less than 90° C., and preferably in the range of from 10° C. to 70° C., and the aluminum trichloride catalytic component added. The resulting dispersion of catalytic components in the inert reaction medium provides an accelerated rate of polymerization of propylene, as demonstrated in the examples presented hereinafter. The preheating of other combinations of the three components does not give the enhanced rate of polymerization. Instead, such preheating destroys the efficacy of the catalyst system for the subsequent polymerization of propylene to form solid polymers. For example, when aluminum trichloride and sodium hydride are preheated and titanium trichloride subsequently added, the resulting system is not effective for polymerizing propylene to polypropylene.

Also as above stated, an object of the present invention is to provide a process for preparing polypropylene in which the molecular weight of the polypropylene is predetermined, i.e., is regulated to a desired value. This is accomplished by adding a small quantity of a normally gaseous olefin such as propylene to the reaction system containing the three catalytic components prior to the elevation of the temperature thereof to the temperaure range of the polymerization reaction. For example, when a small quantity of propylene is added to a dispersion of sodium hydride, titanium trichloride and aluminum trichloride in a saturated hydrocarbon medium, at a temperature below the temperature range of polymerization, say from about 0° C. to 90° C., and preferably from 20° C. to 70° C., in a quantity such that the mole ratio of titanium trichloride to propylene is within the range of from 2:1 to .02:1, and subsequently performing the polymerization reaction as above described, the molecular weight of the polypropylene product is substantially increased over that obtained without the preliminary addition of propylene. The actual molecular weight obtained can be varied by varying the ratio of titanium trichloride to propylene initially introduced. Ethylene or mixtures of ethylene and propylene can be substituted for propylene in the pretreatment of catalyst and good results obtained. The small quantity of ethylene used does not appreciably affect the properties of the polypropylene product. This effect is demonstrated in the examples presented hereinafter.

The following examples illustrate embodiments of the invention in which "parts" refers to parts by weight.

*Example 1*

In order to illustrate the process of the invention, 3.60 parts of sodium hydride, 4.63 parts of titanium trichloride and 2.67 parts of aluminum trichloride were dispersed in about 205 parts of n-heptane contained in a reactor. The mole ratio of titanium trichloride to aluminum trichloride was 1.5:1, and the mole ratio of sodium hydride to titanium trichloride plus aluminum trichloride was 3:1. The dispersion was heated to a temperature of 129° C. and propylene introduced into the reactor to a total pressure of 153 p.s.i.g. The pressure was maintained within the range of from 85 to 153 p.s.i.g. by periodic addition of propylene. The rate of propylene polymerization was such that the pressure drop was at an average rate of 2 p.s.i.g. per minute. The temperature was maintained within the range of from 129° C. to 147° C. and constant mechanical agitation was used. After 6.5 hours the reaction mixture was cooled, vigorously mixed with isopropanol, and then refluxed after adding about 10% by volume (based on the isopropanol added) of nitric acid. The reaction mixture was drained, washed three times with methanol, and then washed with pentane. Excess pentane was removed by evaporation. There were recovered 76.5 parts of polypropylene having a molecular weight of 38,000.

*Example 2*

In order to emphasize the necessity of employing a metal halide or salt wherein the metal is in a valence state other than its highest valence state, Example 1 was repeated except that titanium tetrachloride was employed instead of titanium trichloride. The same quantities of materials and the same reaction conditions were employed. No polypropylene was formed in the reaction mixture.

*Example 3*

In order to illustrate the embodiment of the invention wherein the rate of polymerization is accelerated, titanium trichloride and sodium hydride were dispersed in n-heptane and heated for 1 hour to 120° C. The dispersion was then cooled to 60° C. Aluminum trichloride was then added to the dispersion. The quantities of each of the ingredients were identical to those employed in Example 1 except that a total of about 274 parts of n-heptane were employed. The resulting admixture was then heated to 120° C. and propylene added to give a total pressure of 125 p.s.i.g. The polymerization was continued for 8.5 hours, during which time the temperature was maintained within the range of 120° C. to 138° C. and the pressure within the range of 115 p.s.i.g. to 1 p.s.i.g. by periodic addition of propylene. The rate of propylene polymerization was such that the pressure drop was at an average of 4 p.s.i.g. per minute. The polymer recovered was substantially as described in Example 1.

The foregoing procedure was repeated, except that aluminum trichloride and sodium hydride were first heated in n-heptane and titanium trichloride subsequently added. The same quantities of materials were employed throughout. Propylene was added to give a total pressure of 125 p.s.i.g. and maintained within the range of from 115 to 150 p.s.i.g., and the temperature was held within the range of from 128° C. to 140° C. After 8.5 hours no polypropylene had been produced.

The above procedure wherein titanium trichloride and sodium hydride in n-heptane were first preheated was repeated, except that aluminum trichloride was not added to the reaction mixture. No polypropylene was obtained in the process.

*Example 4*

The procedure of Example 1 was duplicated using the same materials and the same quantities of materials. The procedure, however, was changed by introducing propylene to fill the vapor space to a pressure of 10 p.s.i.g. prior to stirring and heating the catalytic dispersion. The mole ratio of titanium trichloride to propylene added was 1.15:1. After this addition the pressure dropped to substantially atmospheric pressure. The mixture was then heated to 115° C. and propylene introduced with stirring to a pressure of 99 p.s.i.g. After 9.9 hours, during which time the temperature was maintained in the range of 115° C. to 130° C., and the pressure within the range of from 99 p.s.i.g. to 150 p.s.i.g. by periodic addition of propylene, there were obtained 65.7 parts of solid polypropylene polymers having a molecular weight of 90,000.

Repeating this run, except that the pressure is maintained in the range of from 125 p.s.i.g. to 166 p.s.i.g., the polypropylene product had a molecular weight of 84,000.

The foregoing procedure using propylene was repeated except that ethylene was substituted for the propylene for the initial addition of olefin. With the temperature maintained within the range of from 134° C. to 139° C., and the pressure within the range of from 103 p.s.i.g. to 15 p.s.i.g., 41.3 parts of polypropylene having a molecular weight of 42,500 were obtained.

As shown in Exampel 1, which is the equivalent of the present example except for the preliminary introduction of propylene, the molecular weight of the product was 38,000.

*Example 5*

In order to emphasize the importance of maintaining the quantities of catalytic components within the operable ranges, as above given, Example 1 was repeated except that the quantity of sodium hydride was decreased so that the mole ratio thereof to titanium trichloride plus aluminum trichloride was 1, the lower limit permitted. With the reaction conditions substantially as described for Example 1, the quantity of polypropylene produced was not appreciable so that further decrease in the ratio of sodium hydride to other catalytic components is not considered operative.

*Example 6*

The procedure of Example 1 was repeated, using the same materials and quantities thereof except that various materials were substituted for aluminum trichloride. In separate runs, ferric chloride, antimony trichloride, cadmium chloride, bismuth trichloride and zinc chloride were used. A recoverable quantity of polypropylene was not formed in any of these runs.

The foregoing examples illustrate embodiments of the invention. When other materials such as titanium dibromide, titanium dichloride, vanadium dichloride, molybdenum trichloride and the like, are substituted for titanium trichloride, and/or when other hydrides such as lithium hydride, lithium aluminum hydride, and the like, are substituted for sodium hydride, substantially equivalent results are obtained.

The polypropylene products of the invention are useful in the form of thin sheets for wrapping food and other products, as containers for fluids, and the like. Such articles can be made by molding, extrusion, or other fabrication processes.

The invention claimed is:

1. Process for the preparation of polypropylene which comprises dispersing a halide of a metal selected from the group consisting of titanium, zirconium, hafnium, vanadium, niobium, chromium, molybdenum, and tungsten wherein said selected metal is in a valence state other than its highest valence state, and a hydride selected from the group consisting of alkali metal hydrides, alkali metal aluminum hydrides, and alkali metal borohydrides in a saturated hydrocarbon medium, heating the so-formed dispersion to a temperature within the range of between 100° C. and 180° C., cooling the heated dispersion to a temperature of less than 90° C., dispersing aluminum trichloride in the cooled dispersion, heating the resulting dispersion to a temperature within the range of between 100° C. and 180° C., contacting propylene with the heated dispersion within the last-mentioned temperature range, and recovering polypropylene from the reaction mixture, the mol ratio of the halide of said selected metal to aluminum trichloride being from about 0.5:1 to about 10:1, and the mol ratio of said hydride to the halide of said selected metal plus aluminum trichloride being from about 1:1 to about 10:1.

2. Process according to claim 1 wherein said material selected is a halide of titanium.

3. Process according to claim 1 wherein said material selected is a halide of zirconium.

4. Process according to claim 1 wherein said material selected is a halide of vanadium.

5. Process according to claim 1 wherein said material selected is a halide of chromium.

6. Process according to claim 1 wherein said material selected is a halide of molybdenum.

7. Process according to claim 1 wherein said material selected is titanium trichloride.

8. Process according to claim 1 wherein said hydride selected is sodium hydride.

9. Process for the preparation of polypropylene having a predetermined molecular weight which comprises dispersing, in a saturated hydrocarbon medium, aluminum trichloride, a halide of a metal selected from the group consisting of titanium, zirconium, hafnium, vanadium, niobium, chromium, molybdenum, and tungsten wherein said selected metal is in a valence state other than its highest valence state, and a hydride selected from the group consisting of alkali metal hydrides, alkali metal aluminum hydrides, and alkali metal borohydrides, contacting the resulting dispersion at a temperature of from 0° C. to 90° C. with a predetermined quantity of a normally gaseous olefin, then heating said dispersion to a temperature within the range of between 100° C. and 180° C., contacting propylene with said dispersion maintained within said last-mentioned temperature range, and recovering polypropylene from the reaction mixture, said predetermined quantity of said normally gaseous olefin being such that the mol ratio of said halide of said selected metal to said normally gaseous olefin is in the range of from about 2:1 to about 0.02:1, the mol ratio of the halide of said selected metal to aluminum trichloride being from about 0.5:1 to about 10:1, and the mol ratio of said hydride to the halide of said selected metal plus aluminum trichloride being from about 1:1 to about 10:1.

10. Process according to claim 9 wherein said material selected is titanium trichloride and said hydride is sodium hydride.

11. Process according to claim 9 wherein said metal selected is titanium.

12. Process according to claim 9 wherein said metal selected is zirconium.

13. Process according to claim 9 wherein said metal selected is vanadium.

14. Process according to claim 9 wherein said metal selected is chromium.

15. Process according to claim 9 wherein said metal selected is molybdenum.

References Cited in the file of this patent

UNITED STATES PATENTS

| | | |
|---|---|---|
| 2,567,972 | Schlesinger | Sept. 18, 1951 |
| 2,721,189 | Anderson et al. | Oct. 18, 1955 |
| 2,822,357 | Brebner et al. | Feb. 4, 1958 |
| 2,843,577 | Friedlander et al. | June 15, 1958 |

FOREIGN PATENTS

| | | |
|---|---|---|
| 538,782 | Belgium | June 6, 1955 |
| 547,618 | Belgium | Nov. 7, 1956 |
| 874,215 | Germany | Apr. 20, 1953 |

OTHER REFERENCES

Natta et al.: La Chimica E. L'Industria, vol. 38, No. 2, pp. 124–127, February 1956.